(12) United States Patent
Fuller et al.

(10) Patent No.: US 9,722,974 B1
(45) Date of Patent: Aug. 1, 2017

(54) AUTOMATED DATA RE-ENCRYPTION PROCESS IN MULTI-TIERED ENCRYPTION SYSTEM

(71) Applicant: Amazon Technologies, Inc., Seattle, WA (US)

(72) Inventors: Erik James Fuller, Victoria (CA); Ali Mustafa Nassaje, Victoria (CA); Julie Anne Margaret Sparrow, Victoria (CA); Volker R. A. Tilgner, Victoria (CA); Kerry Michael Wright, Victoria (CA)

(73) Assignee: AbeBooks Inc., Victoria, British Columbia (CA)

( * ) Notice: Subject to any disclaimer, the term of this patent is extended or adjusted under 35 U.S.C. 154(b) by 82 days.

(21) Appl. No.: 14/575,906

(22) Filed: Dec. 18, 2014

(51) Int. Cl.
*H04L 29/06* (2006.01)

(52) U.S. Cl.
CPC ........ *H04L 63/0428* (2013.01); *H04L 63/061* (2013.01)

(58) Field of Classification Search
CPC   H04L 63/0478; H04L 63/0428; H04L 63/061
USPC ........................................................ 713/171
See application file for complete search history.

(56) References Cited

U.S. PATENT DOCUMENTS

| | | | | |
|---|---|---|---|---|
| 5,915,025 A | * | 6/1999 | Taguchi | G06F 12/145 380/44 |
| 8,832,466 B1 | * | 9/2014 | McGregor, Jr. | H04L 9/0836 380/37 |
| 9,172,532 B1 | | 10/2015 | Fuller et al. | |
| 2007/0239998 A1 | * | 10/2007 | Beck | G06F 19/322 713/193 |

OTHER PUBLICATIONS

Bhargava, Vikas, "U.S. Appl. No. 14/575,906—Proposed Examiner's Amendment", Nov. 4, 2016, 8 pages.*

* cited by examiner

*Primary Examiner* — Jeffrey D Popham
(74) *Attorney, Agent, or Firm* — Knobbe Martens Olson & Bear LLP

(57) ABSTRACT

A re-encryption service module in a multi-tiered encryption system that manages key rotation policies continuously or periodically re-encrypts data. Each encryption tier in the system can include a node programmed to service encryption, decryption, and/or re-encryption requests and a key store to store encryption keys. A computing node that interfaces with a requesting device may include the re-encryption service module. The re-encryption module may receive encrypted data and a key identifier identifying the key used to encrypt the data. The re-encryption module may decrypt the encrypted data using the identified key, retrieve a new key if the identified key is exhausted, and use the new key to encrypt the decrypted data. The key identifier may be updated to identify the new key and the re-encrypted data and the updated key identifier may be transmitted to the requesting device.

25 Claims, 4 Drawing Sheets

AUTOMATED DATA RE-ENCRYPTION PROCESS IN MULTI-TIERED ENCRYPTION SYSTEM

BACKGROUND

To protect transmissions of sensitive data, an electronic device may encrypt the sensitive data before transmission. Once the transmission reaches the intended recipient, the intended recipient may decrypt the transmitted data to extract the sensitive data. In some cases, the electronic devices may request an external service to perform the encryption and decryption via a network. Encryption and decryption can be processor intensive, so offloading such tasks to an external service can allow the electronic devices to dedicate resources to other processes.

Devices, such as hardware security modules (HSMs), can house external encryption and decryption services. In some instances, HSMs operate by encrypting or decrypting data using one or more keys. HSMs may also operate under a set of encryption policies provided by the user. Encryption policies mandate how the data is handled and how the keys are used. For example, the encryption policies may dictate how a service is supposed to operate if a key is compromised.

While offloading encryption and decryption to HSMs may ease the burden placed on electronic devices, HSMs may introduce additional constraints. For example, the encryption policies enforced by HSMs may limit the total amount of data that can be encrypted, the total number of encrypt operations for a single key, or the total amount of time a key can be used. In addition, because the HSMs are accessed over a network, requesting and receiving encrypted or decrypted data can be latency sensitive. Finally, HSMs can be expensive to implement and operate.

DETAILED DESCRIPTION

Introduction

Figure 1:
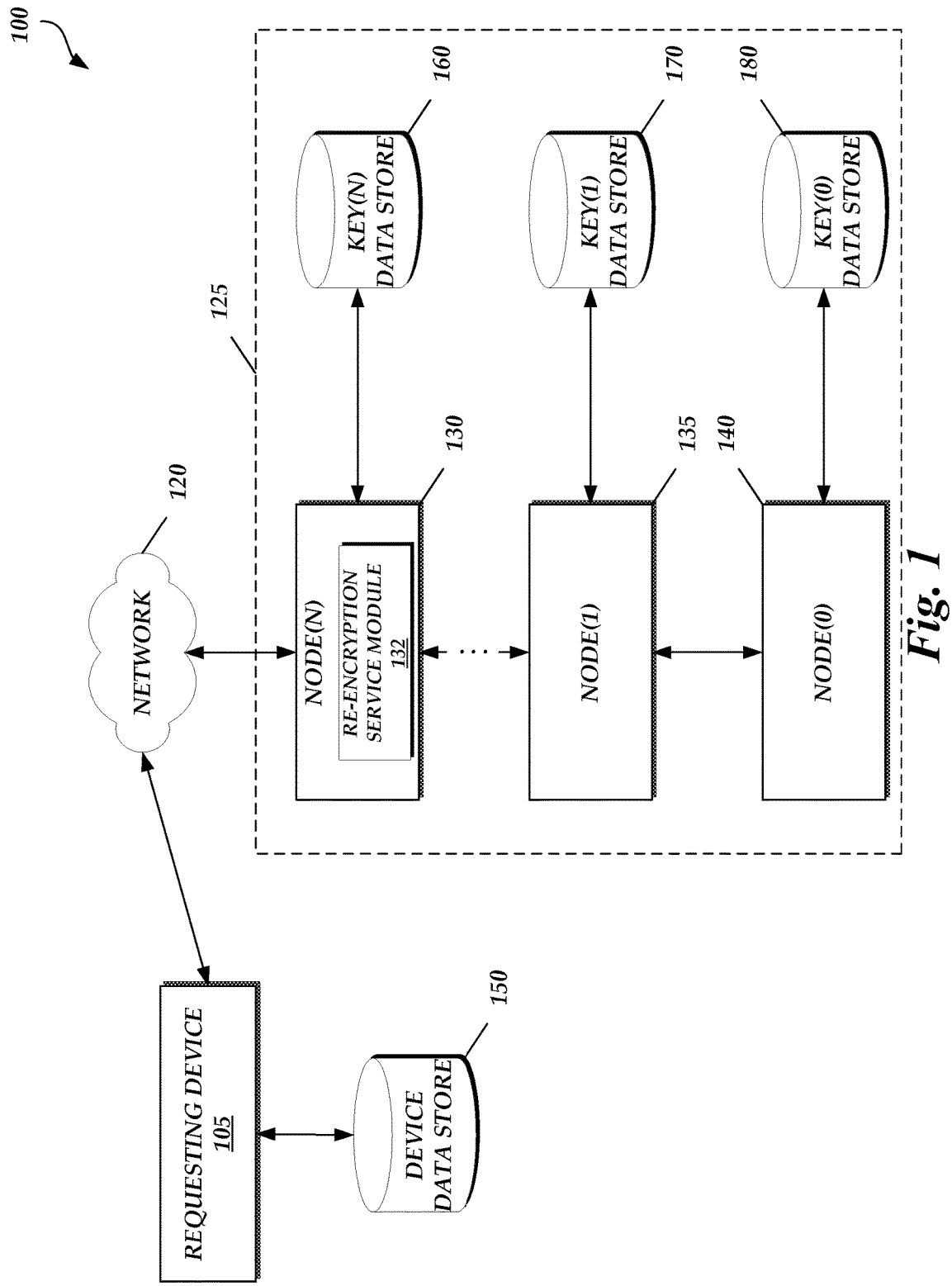
FIG. 1 illustrates a block diagram of a data re-encryption system in a multi-tiered encryption service.

As described above, devices, such as hardware security modules (HSMs), can be used to perform encryption and decryption services. HSMs can be accessed by electronic devices via a network and may use one or more keys to perform encryption and/or decryption. For example, HSMs may include a root or master key and one or more other keys that are used for encryption and/or decryption. In some HSMs, the root key can be used to derive the other keys. Thus, keeping the root key confidential may be critical to maintaining the integrity of data that has been encrypted by the HSM.

In addition, HSMs typically operate according to an encryption policy. The encryption policy may include procedures for handling data and keys to increase the likelihood that keys remain confidential. In particular, the encryption policy may be a statement, explicit or implied, that bounds the use of a particular encryption key. For example, the encryption policy may limit the use of an encryption key (1) to a maximum number of encrypt operations (e.g., the encryption key may only be used to encrypt data 10,000 times), (2) to a time limit (e.g., the encryption key may only be used for three months), and/or (3) to a total payload (e.g., the encryption key may only be used to encrypt 10 GB of data). By limiting the use of an encryption key, the likelihood that an encryption key could be reverse-engineered or otherwise compromised, thereby endangering data encrypted using the encryption key, is reduced.

Similarly, to reduce the likelihood that encrypted data is compromised via the reverse-engineering of an encryption key used to encrypt the data, a user may wish to continuously or periodically re-encrypt his or her data using a new encryption key. Using the electronic device, the user could provide the HSM with a new encryption key to use each time the user requests the encrypted data to be re-encrypted. However, selecting and maintaining encryption keys can be burdensome for the user and transferring the encryption keys over a network can increase the chances that the encryption keys become compromised.

Instead of the user providing the new encryption keys, an encryption policy defining the rotation of encryption keys (e.g., the selection of another encryption key to take the place of an encryption key that can no longer be used to encrypt data) could be an option for re-encrypting data. However, rotating encryption keys can be difficult and expensive. For example, while new encryption keys can replace old encryption keys for encrypting data, all encryption keys must be maintained to ensure that both data encrypted using the old encryption keys and data encrypted using the new encryption keys can be decrypted. Additionally, encryption policies must be generated and maintained to dictate how and how often encryption keys are to be rotated. The encryption policies may become more complex as the number of encryption keys increases. The generation of additional encryption keys may also require the implementation of additional HSMs. HSMs, though, can be expensive to implement, and implementing additional HSMs may further exacerbate any latency issues. In fact, in some instances, it actually may be undesirable to rotate a root key because other keys may depend on the root key and rotation of the root key can leave the root key vulnerable to detection. Thus, the encryption policy may limit the functionality of an HSM.

Accordingly, a data re-encryption service within a multi-tiered encryption system that manages key rotation policies is described herein that is capable of continuously or periodically re-encrypting user data. For example, a multi-tiered encryption system can include one or more encryption tiers. Each encryption tier can include a computing node (e.g., a computing device including one or more processors coupled to a memory) programmed to service encryption and/or decryption requests and a key store (e.g., a computer-readable storage medium or device) to store encryption keys. Furthermore, each encryption tier can execute instructions to encrypt an unencrypted payload and/or to decrypt an encrypted payload. Multi-tiered encryption systems are described in greater detail in U.S. patent application Ser. No. 14/084,440, titled "MULTI-TIERED ENCRYPTION SYSTEM FOR EFFICIENTLY REGULATING USE OF ENCRYPTION KEYS" and filed on Nov. 19, 2013, the disclosure of which is hereby incorporated herein by reference in its entirety.

As an example, the multi-tiered encryption system can be referred to as an n-tiered encryption system. The encryption tier identified as Tier(n) can be the encryption tier that interfaces directly (via a network) with various electronic devices that request encryption and/or decryption services.

Each of the remaining encryption tiers (e.g., identified as Tier(0), Tier(1), Tier(2), . . . Tier(n−1)) can be considered infrastructure encryption tiers that support the encryption and/or decryption service. As used herein, Tier(n) is referred to as the highest encryption tier and Tier(0) is referred to as the lowest encryption tier. Thus, Tier(2), for example, is an encryption tier that is higher than Tier(0) and lower than Tier(n).

Tier(0) is the encryption tier that includes a key store that stores one or more root encryption keys. In some instances, the root encryption keys are unencrypted and stored as such, meaning they are not encrypted by other keys in the n-tiered encryption system. The remaining infrastructure encryption tiers can include key stores that store one or more encrypted encryption keys. The one or more encrypted encryption keys may be encrypted by encryption keys stored in a key store included in a lower encryption tier. For example, the encrypted encryption keys stored in a key store included in Tier(m), where m>0, can be encrypted by encryption keys stored in a key store included in any of Tier(0) through Tier(m−1). Generally, however, encrypted encryption keys stored in a key store included in a first encryption tier are encrypted by encryption keys stored in a key store included in the encryption tier immediately below the first encryption tier (e.g., the encrypted encryption keys stored in a key store included in Tier(m), where m>0, are encrypted by encryption keys stored in a key store included in Tier(m−1)). Thus, an unencrypted root encryption key stored in the key store included in Tier(0) can be used to encrypt one or more encryption keys associated with Tier(1). One or more encryption keys associated with Tier(1) can be used to encrypt one or more encryption keys associated with Tier(2), and so on. The encrypted Tier(1) encryption keys can be stored in a key store included in Tier(1), the encrypted Tier(2) encryption keys can be stored in a key store included in Tier(2), and so on.

In an embodiment, the multi-tiered encryption system implements encryption policies, such as use-based key rotation policies, access policies, and revocation handling policies. For example, the key rotation policy may globally (for all tiers) specify that an encryption key can only be used for at most M encryption operations. If an encryption key stored in a key store included in a particular encryption tier is used for M encrypt operations, the encryption tier can create or obtain a new encryption key to fulfill an M+1$^{th}$ encrypt request. This may be true even for the root or master key such that the root or master key can be automatically rotated.

Generally, an n-tiered encryption system with a limit of M encrypt operations per encryption key can perform a maximum of $M^{n+1}$ encrypt operations without having to rotate a root encryption key. As an example, M could be 10,000. Thus, a root encryption key stored in a key store included in Tier(0) can perform 10,000 encrypt operations. In particular, the root encryption can be used to encrypt 10,000 encryption keys stored in a key store included in Tier(1). Likewise, each of the 10,000 encryption keys stored in a key store included in Tier(1) can perform 10,000 encrypt operations. Accordingly, by introducing Tier(1), the multi-tiered encryption system can perform 100,000,000 encrypt operations before a key rotation takes place at Tier(0) (e.g., before a new root key is created at Tier(0)). If Tier(2) is introduced, then the number of encrypt operations that can be performed by the multi-tiered encryption system increases to 1,000,000,000,000.

In an embodiment, an electronic device can request encryption services from the multi-tiered encryption system. The encryption tier that interfaces with the electronic device via a network can receive data from the electronic device and perform encryption of the data using a single encryption key. If use of the single encryption key has reached a limit as defined by the use-based rotation policy such that a pending encrypt operation would violate the rotation policy, the encryption tier generates a new encryption key for the pending encrypt operation.

The encrypted data and a reference to the literal encryption key used to encrypt the data can be returned to the electronic device. Thus, the electronic device can provide the reference along with encrypted data when requesting decryption of the encrypted data (e.g., yielding O(1) performance in locating the encryption key to use when performing the decryption). For example, the multi-tiered encryption system could provide the encrypted data and metadata (e.g., a reference to the literal encryption key and/or other relevant information) to the electronic device as logically separate entities (e.g., within two separate data packets) or as logically same entities (e.g., the metadata could be embedded within the encrypted data such that inclusion of the metadata takes place without the awareness of the user of the electronic device).

In some embodiments, logical encryption keys can be used by the multi-tiered encryption system to provide additional flexibility. Logical encryption keys may exist to allow electronic devices the option of having different encryption policies (e.g., use-based rotation policies) linked to encrypt and decrypt operations. In particular, logical encryption keys may allow the multi-tiered encryption system to manage encryption keys under different configurations and/or policies.

A logical encryption key can be provided to an electronic device. When requesting an encrypt operation, the electronic device can provide the logical encryption key and the data to be encrypted. The multi-tiered encryption system can then de-reference the logical encryption key to identify a literal encryption key. The literal encryption key can be used to perform the actual encryption. If the literal encryption key is exhausted according to the use-based rotation policy, then the multi-tiered encryption system can generate a new literal encryption key to take the place of the exhausted literal encryption key such that an association is established between the new literal encryption key and the logical encryption key (e.g., at a time that the literal encryption key is exhausted or when a subsequent encrypt or re-encrypt operation is received). The new literal encryption key can then be used to perform the actual encryption and can be used in subsequent encrypt operations until the use-based rotation policy dictates that a second new literal encryption key should be generated.

The use-based rotation policy can be further leveraged to offer data re-encryption services. A data re-encryption service may re-encrypt encrypted data using a different encryption key. The encryption tier that interfaces with the electronic device via a network may include a re-encryption service module that is capable of continuously or periodically re-encrypting data in an automated manner. For example, when requesting a re-encrypt operation, the electronic device can provide the logical encryption key and the encrypted data. The re-encryption service may decrypt the encrypted data using the literal encryption key referenced by the logical encryption key. The re-encryption service may then check to determine whether the literal encryption key is exhausted. The re-encryption service may determine that a literal encryption key is exhausted in one or more ways, such as by determining that (1) the total amount of data encrypted using the literal encryption key exceeds a first threshold value, (2) the total number of encrypt operations performed using the literal encryption key exceeds a second threshold value, (3) the total amount of time that the literal encryption key has been in existence or in use exceeds a third threshold value, and/or (4) the literal encryption key has already been used to encrypt the data for which a re-encryption operation is requested. If the literal encryption key is exhausted, the re-encryption service may determine whether another literal encryption key has been provisioned as a replacement. If another literal encryption key has been provisioned as a replacement, the new literal encryption key can be used to encrypt the decrypted data. Otherwise, the multi-tiered encryption system can generate a new literal encryption key to take the place of the exhausted literal encryption key. Alternatively, the multi-tiered encryption system may generate a new literal encryption key even if the original literal encryption key is not exhausted so that the data is not re-encrypted using the same literal encryption key. The re-encryption service may then encrypt the decrypted data using the new literal encryption key and the new literal encryption key may be stored in a key store in a manner as described above. The re-encryption service may further create an association between the logical encryption key and the new literal encryption key such that receiving the logical encryption key instructs the multi-tiered encryption system to decrypt or encrypt data using the new literal encryption key. If the literal encryption key is not exhausted, the re-encryption service may encrypt the decrypted data using the non-exhausted literal encryption key. Once the encryption is complete, the re-encryption service may forward the logical encryption key and the encrypted data to the electronic device.

The data may be re-encrypted for an indefinite amount of time. For example, the electronic device may transmit requests to re-encrypt the same encrypted data periodically at a scheduled time (e.g., every day at a certain time), when encrypted data is returned to the electronic device, or at any other arbitrary time. The electronic device may continuously transmit such requests for an indefinite period of time. Thus, the re-encryption service may re-encrypt data, transmit the re-encrypted data to the electronic device, receive another request to re-encrypt data, and repeat the process indefinitely. Each time the re-encryption service receives a request to re-encrypt the encrypted data, the re-encryption service may use a different literal encryption key. Accordingly, a user or software component may use the re-encryption service to continuously re-encrypt his or her data, where each re-encryption uses a different literal encryption key.

In some embodiments, the re-encryption service loads a dataset including a plurality of encrypted data and automatically re-encrypts each encrypted data in the dataset. For example, the dataset may include data elements (e.g., organized in rows), where at least some of the data elements each include encrypted data. For each data element in the dataset (that includes encrypted data), the re-encryption service may decrypt the encrypted data using the literal encryption key referenced by the logical encryption key, determine whether the literal encryption key in use (either the literal encryption key used to decrypt the data or a new literal encryption key) is exhausted, and encrypt the decrypted data using the current literal encryption key or a new encryption key if the current literal encryption key is exhausted. Thus, the encrypted data in each data element may be replaced with the re-encrypted data. If a new literal encryption key is used to encrypt the decrypted data, the re-encryption service may update the association of the logical encryption key to the new encryption key. If multiple new literal encryption keys are used to encrypt the decrypted data (e.g., the encrypted data in some data elements are re-encrypted using a first new literal encryption key and the encrypted data in other data elements are re-encrypted using a second new literal encryption key because the first new literal encryption key is exhausted), then a first logical encryption key may be updated to be associated with the first new literal encryption key, a second logical encryption key may be updated to be associated with the second new literal encryption key, and so on. The re-encrypted dataset and the one or more logical encryption keys may be then transmitted to the electronic device.

In some instances, the dataset may be a large file (e.g., the dataset may include millions of data elements or rows). The multi-tiered encryption system may partition the dataset and provision a plurality of re-encryption service modules such that at least some of the re-encryption service modules each re-encrypt a portion of the dataset. Thus, the multi-tiered encryption system may parallelize the re-encryption process to reduce the latency in providing re-encrypted data to the electronic device.

While the multi-tiered encryption system is described herein as including a re-encryption service that automatically decrypts and encrypts data, this is not meant to be limiting. The re-encryption process described herein may also be implemented by an electronic device requesting a decrypt operation and an encrypt operation in succession. For example, the electronic device may request a decrypt operation and receive the decrypted data. The electronic device may then pass back the decrypted data and request an encrypt operation. The multi-tiered encryption system, because of the use-based rotation policy, may automatically use a new literal encryption key to perform the encrypt operation if the original literal encryption key is exhausted.

Re-Encryption Service Overview

FIG. 1 illustrates a block diagram of a key verification system in a multi-tiered encryption service 100 according to one embodiment. As illustrated in FIG. 1A, the multi-tiered encryption service 100 includes a requesting device 105, a network 120, a multi-tiered encryption system 125, and a device data store 150. The multi-tiered encryption system 125 may, but need not, be implemented as described in U.S. patent application Ser. No. 14/084,440, referenced above, but with the addition of a re-encryption service module 132.

The requesting device 105 can be configured to submit encryption and/or decryption requests to the multi-tiered encryption system 125. For example, such requests may include requests to encrypt, decrypt, and/or re-encrypt electronic messages (e.g., e-mails, text messages, etc.), credit card data (e.g., credit card numbers, billing information, etc.), identifications (e.g., driver's licenses, passports, etc.), bank account information, and/or other sensitive data. Such requests can be made via the network 120. The requesting device 105 can retrieve data to be encrypted, decrypted, or re-encrypted and/or key references from the device data store 150.

In an embodiment, the requesting device 105 may be a user computing device. For example, the requesting device 105 can include a wide variety of electronic devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The requesting device 105 may include a microphone, a speaker, a wireless module, a camera, and/or a display.

In an embodiment, the device data store 150 may store data that is to be encrypted, data that is to be decrypted, data that is to be re-encrypted, and/or key references that identify an encryption key used to encrypt already encrypted data. In some embodiments, the device data store 150 is a single data store. In other embodiments, the device data store 150 is distributed over many different locations.

The network 120 may be a wired network, a wireless network, or a combination of the two. For example, the network 120 may be a personal area network, a local area network (LAN), a wide area network (WAN), or combinations of the same. Protocols and components for communicating via any of the other aforementioned types of communication networks, such as the TCP/IP protocols, can be used in the network 120.

In an embodiment, the multi-tiered encryption system 125 is configured to perform any or all of the operations disclosed herein other than those performed by the requesting device 105. As illustrated in FIG. 1, the multi-tiered encryption system 125 includes node(N) 130, node(1) 135, node(0) 140, key(N) data store 160, key(1) data store 170, and key(0) data store 180. For simplicity, the integer N is assumed to be a 2 in the disclosure such that the multi-tiered encryption system 125 is a three-tiered encryption system. However, while the particular multi-tiered encryption system 125 illustrated in FIG. 1 may be a three-tiered encryption system, this is not meant to be limiting. The number of tiers may alternatively be 1, 2, 4, 5, 6, or any other positive integer. For example, one or more additional nodes may be present between node(N) 130 and node(1) 135. In addition, while each tier in the multi-tiered encryption system 125 includes one node 130, 135, or 140, this is not meant to be limiting. The number of nodes per tier may alternatively be 2, 3, 4, 5, 6, or any other positive integer. Furthermore, while each node 130, 135, and 140 is associated with a separate key data store 160, 170, and 180, this is not meant to be limiting, as one or more of the key data stores 160, 170, and/or 180 can be combined into a single key data store. For example, node(N) 130, node(1) 135, node(0) 140, and/or any nodes between node(N) 130 and node(1) 135 can share a key data store 160, 170, and/or 180. Moreover, any combination of nodes 130, 135, and/or 140 can be housed in the same device (e.g., the nodes 130, 135, and/or 140 can be collapsed into a single node and the single node may implement the functionality of a tiered encryption system) or different devices and any combination of nodes 130, 135, and/or 140 can be associated with the same local network.

In an embodiment, each node 130, 135, and 140 is a computing device including one or more processors coupled to a memory configured to service an encryption, decryption, and/or re-encryption request. Each key data store 160, 170, and 180 can include a non-transitory computer-readable storage medium configured to store encrypted encryption keys and identifiers that identify the encryption key used to encrypt a respective encryption key. As referred to herein, node(0) 140 and key(0) data store 180 together can be considered Tier(0), node(1) 135 and key(1) data store 170 together can be considered Tier(1), and node(N) 130 and key(N) data store 160 together can be considered Tier(N) (or Tier(2) as described herein).

Tier(N) can serve as the interface between the multi-tiered encryption system 125 and the requesting device 105. In operation, the requesting device 105 can transmit an encryption, decryption, and/or re-encryption request to node(N) 130 via the network 120. The request may include encrypted or unencrypted data and/or a key reference that identifies a literal encryption key that is used to encrypt or decrypt data. For example, the requesting device 105 transmits an encryption request to node(N) 130, where the request includes data to be encrypted. Node(N) 130 can retrieve an available encrypted encryption key (e.g., an unrevoked encryption key) from key(N) data store 160 for use in encrypting the data. In some embodiments, node(N) 130 also retrieves an identifier that identifies the encryption key used to encrypt the encryption key retrieved from key(N) data store 160.

Because the encryption key retrieved from key(N) data store 160 is encrypted, node(N) 130 may request a decrypt operation from the node in the next lowest tier (e.g., node(1) 135), where the request includes the retrieved encryption key and/or an identifier of the encryption key used to encrypt the encryption key retrieved from key(N) data store 160. Node(1) 135 can then retrieve an encryption key from key(1) data store 170 and an identifier that identifies the encryption key used to encrypt the encryption key retrieved from key(1) data store 170, where the encryption key retrieved from key(1) data store 170 is the encryption key used to encrypt the encryption key retrieved from key(N) data store 160. In some embodiments, if node(N) 130 has previously requested that the encryption key retrieved from key(N) data store 160 be decrypted, the decrypted version of the encryption key retrieved from key(N) data store 160 may be stored in the memory (e.g., cache) of node(N) 130.

Like the encryption key retrieved from key(N) data store 160, the encryption key retrieved from key(1) data store 170 is also encrypted. Thus, node(1) 135 may request a decrypt operation from node(0) 140, where the request includes the encryption key retrieved from key(1) data store 170 and/or an identifier of the encryption key used to encrypt the encryption key retrieved from key(1) data store 170. In some embodiments, if node(1) 135 has previously requested that the encryption key retrieved from key(1) data store 170 be decrypted, the decrypted version of the encryption key retrieved from key(1) data store 170 may be stored in the memory (e.g., cache) of node(1) 135.

As described above, unencrypted root encryption keys can be stored in Tier(0). Thus, node(0) 140 can retrieve a root encryption key from key(0) data store 180 that was used to encrypt the encryption key retrieved from key(1) data store 170. Node(0) can use the root encryption key to decrypt the encryption key retrieved from key(1) data store 170. The decrypted version of the encryption key retrieved from key(1) data store 170 can then be transmitted to node(1) 135.

Node(1) 135 can then use the decrypted version of the encryption key retrieved from key(1) data store 170 to decrypt the encryption key retrieved from key(N) data store 160. The decrypted version of the encryption key retrieved from key(N) data store 160 can then be transmitted to node(N) 130. Once the encryption key retrieved from key (N) data store 160 is decrypted, node(N) 130 can encrypt the data received from the requesting device 105. In some embodiments, the node(N) 130 transmits the encrypted data and a reference to the encryption key retrieved from the key(N) data store 160 back to the requesting device 105 to complete the encryption process.

In an embodiment, node(N) 130 includes a re-encryption service module 132 that performs the re-encryption process described herein. For example, the re-encryption service module 132 may be capable of continuously or periodically re-encrypting data in an automated manner. In operation, the requesting device 105 can transmit a re-encryption request to node(N), which is received by the re-encryption service module 132. The request may include a logical encryption key and encrypted data. The re-encryption service module 132 may decrypt the encrypted data using the literal encryption key referenced by the logical encryption key. An encrypted version of the literal encryption key may be stored in the key(N) data store 160 along with an identifier that identifies the encryption key used to encrypt the literal encryption key. Thus, the re-encryption service module 132 may use the identifier to request a decrypted version of the literal encryption key (e.g., from the node(1) 135) such that the re-encryption service module 132 can decrypt the encrypted data.

The re-encryption service module 132 may then determine whether the literal encryption key used to decrypt the encrypted data is exhausted. The re-encryption service module 132 may determine that a literal encryption key is exhausted in one or more ways, such as by determining that (1) the total amount of data encrypted using the literal encryption key exceeds a first threshold value, (2) the total number of encrypt operations performed using the literal encryption key exceeds a second threshold value, (3) the total amount of time that the literal encryption key has been in existence or in use exceeds a third threshold value, and/or (4) the literal encryption key has already been used to encrypt the data for which a re-encryption operation is requested. If the literal encryption key is exhausted, the re-encryption service module 132 may determine whether another literal encryption key has been provisioned by the node(N) 130 as a replacement. If another literal encryption key has been provisioned by the node(N) 130 as a replacement, the re-encryption service module 132 may use the new literal encryption key to encrypt the decrypted data. Otherwise, the node(N) 130 (or node(1) 135 or node(0) 140) can generate a new literal encryption key to take the place of the exhausted literal encryption key. Alternatively, the node(N) 130 may generate a new literal encryption key even if the original literal encryption key is not exhausted so that the data is not re-encrypted using the same literal encryption key. The re-encryption service module 132 may then encrypt the decrypted data using the new literal encryption key and an encrypted version of the new literal encryption key may be stored by the node(N) 130 in the key(N) data store 160 along with an identifier that identifies the encryption key used to encrypt the new literal encryption key. The re-encryption service module 132 may further associate the logical encryption key received from the requesting device 105 with the new literal encryption key such that the logical encryption key references the new literal encryption key in place of the literal encryption key used to decrypt the encrypted data. If the literal encryption key is not exhausted, the re-encryption service module 132 may encrypt the decrypted data using the non-exhausted literal encryption key. Once the encryption is complete, the re-encryption service module 132 may forward the logical encryption key and the re-encrypted data to the requesting device 105.

As described above, the re-encryption service module 132 may load a dataset that includes a plurality of encrypted data and automatically re-encrypts each encrypted data in the dataset. For example, the request from the requesting device 105 may include the dataset and one or more logical encryption keys (where the logical encryption keys are each associated with a portion of the dataset). The dataset may include data elements (e.g., organized in rows), where at least some of the data elements each include encrypted data. For each data element in the dataset (that includes encrypted data), the re-encryption service module 132 may decrypt the encrypted data using a literal encryption key referenced by the logical encryption key that corresponds with the respective data element, determine whether the literal encryption key in use (either the literal encryption key used to decrypt the data or another literal encryption key) is exhausted, and encrypt the decrypted data using the current literal encryption key or a new encryption key if the current literal encryption key is exhausted. Thus, the re-encryption service module 132 may replace the encrypted data in each data element with the re-encrypted data. If a new literal encryption key is used to encrypt the decrypted data, the re-encryption service module 132 may associate the logical encryption key with the new encryption key. If multiple new literal encryption keys are used to encrypt the decrypted data (e.g., the encrypted data in some data elements are re-encrypted using a first new literal encryption key and the encrypted data in other data elements are re-encrypted using a second new literal encryption key because the first new literal encryption key is exhausted), then the re-encryption module 132 may associate a first logical encryption key with the first new literal encryption key, a second logical encryption key with the second new literal encryption key, and so on. The re-encryption service module 132 may then transmit the re-encrypted dataset and the one or more logical encryption keys to the requesting device 105.

In some instances, the dataset may be a large file (e.g., the dataset may include millions of data elements or rows). The multi-tiered encryption system 125 (and/or a node 130, 135, and/or 140 in the multi-tiered encryption system 125) may partition the dataset and provision a plurality of re-encryption service modules 132 (e.g., one or more re-encryption service modules 132 in one or more nodes 130, 135, and/or 140) such that at least some of the re-encryption service modules 132 each re-encrypt a portion of the dataset. Thus, the multi-tiered encryption system 125 may parallelize the re-encryption process to reduce the latency in providing re-encrypted data to the requested device 105.

While the node(N) 130 is illustrated as including the re-encryption service module 132, this is not meant to be limiting. The re-encryption service module 132 may be implemented in any node or can be external to the multi-tiered encryption system 125. For example, the re-encryption service module 132 may be a stand-alone service implemented in a separate node that serves as an intermediary between the node(N) 130 and the requesting device 105. The separate node may be included within the multi-tiered encryption system 125 or may be a separate entity or included in a separate server.

In other embodiments, not shown, the multi-tiered encryption system 125 can be local to the requesting device 105. For example, the multi-tiered encryption system 125 can be executed by a processor embedded within the requesting device 105. As another example, the multi-tiered encryption system 125 can be executed by another device coupled directly to the requesting device 105 (e.g., via a wired or wireless connection, such as USB, IEEE 1394, IEEE 802.11, Bluetooth, etc.). The multi-tiered encryption system 125, when local to the requesting device 105, can perform any of the operations discussed herein.

Example Re-Encryption Process

Figure 2:
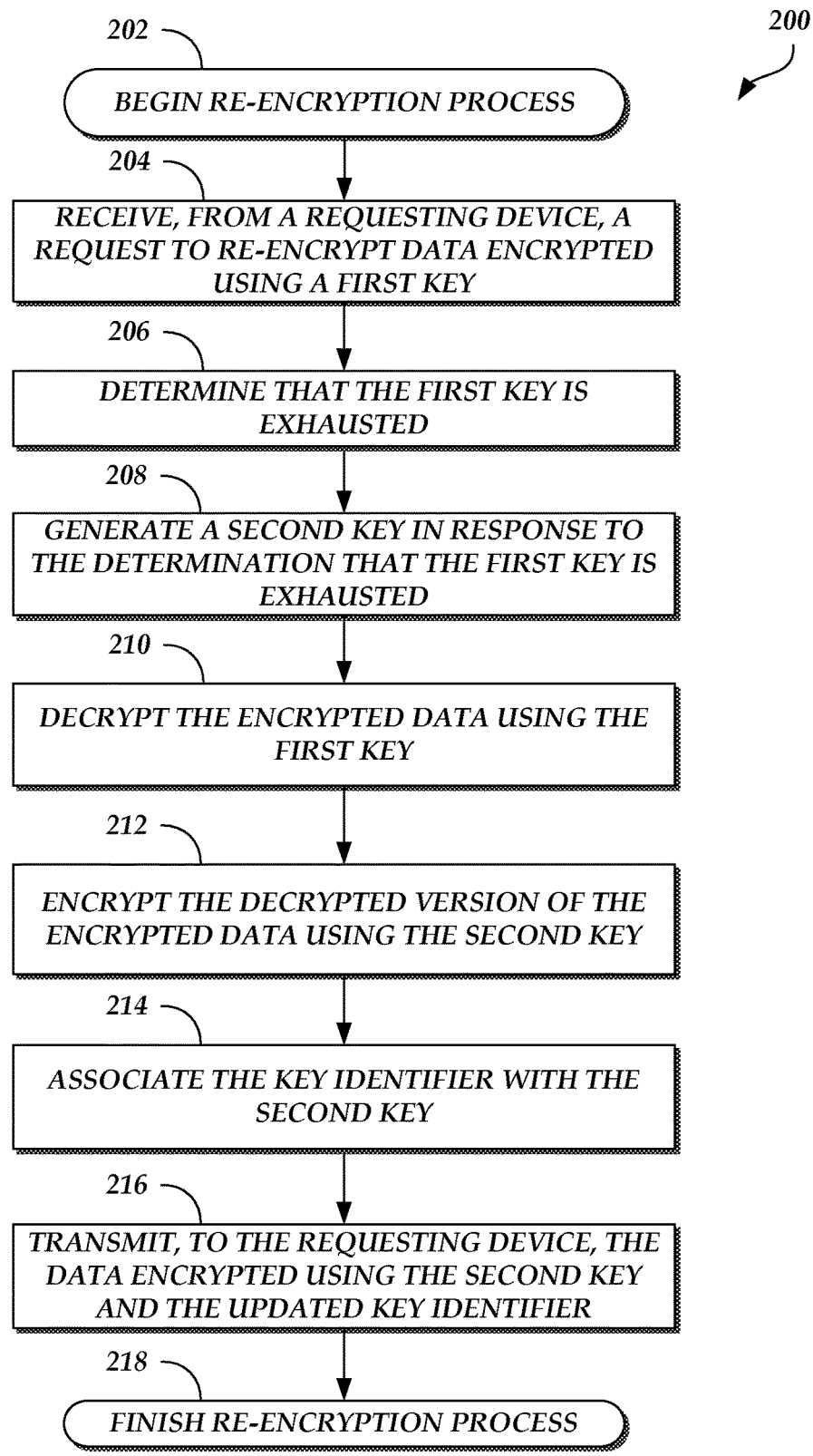
FIG. 2 illustrates a process that may be used by a computer system to re-encrypt data.

FIG. 2 illustrates a process 200 that may be used by a computer system to re-encrypt data. As an example, the multi-tiered encryption system 125 of FIG. 1, and specifically the node(N) 130 (under the control of the re-encryption service module 132), can be configured to execute the re-encryption process 200. The re-encryption process 200 begins at block 202.

At block 204, a request from a requesting device to re-encrypt data encrypted using a first key is received. In an embodiment, the request includes encrypted data and a logical encryption key that identifies a literal encryption key (e.g., the first key) used to encrypt the encrypted data. The request may be received a sufficient amount of time after the encrypted data was encrypted such that a literal encryption key used to encrypt the encrypted data is now exhausted.

At block 206, a determination that the first key is exhausted is made. For example, the first key may be exhausted if an amount of data encrypted by the first key has exceeded a first threshold value, if a number of times that the first key has been used to encrypt all data has exceeded a second threshold value, if the total amount of time that the first key has been in existence or in use exceeds a third threshold value, and/or if the first key has already been used to encrypt the data for which a re-encryption operation is requested.

At block 208, a second key is generated in response to the determination that the first key is exhausted. The second key may be generated and stored in the same encryption tier as the first key.

At block 210, the encrypted data is decrypted using the first key. In an embodiment, the encrypted data is decrypted before the determination that the first key is exhausted is made.

At block 212, the decrypted version of the encrypted data is encrypted using the second key. Thus, the encrypted data received from the requesting device may be re-encrypted using the second key.

At block 214, a key identifier (e.g., the logical encryption key) is associated with the second key. For example, updating the key identifier causes the key identifier to reference the second key instead of the first key. Thus, when sent with the key identifier, data may be encrypted or decrypted using the second key.

At block 216, the data encrypted using the second key and the updated key identifier are transmitted to the requesting device. After the data encrypted using the second key and the updated key identifier are transmitted to the requesting device, the re-encryption process 200 ends, as illustrated at block 218.

Example Re-Encryption with Key Rotation

Figure 3A:
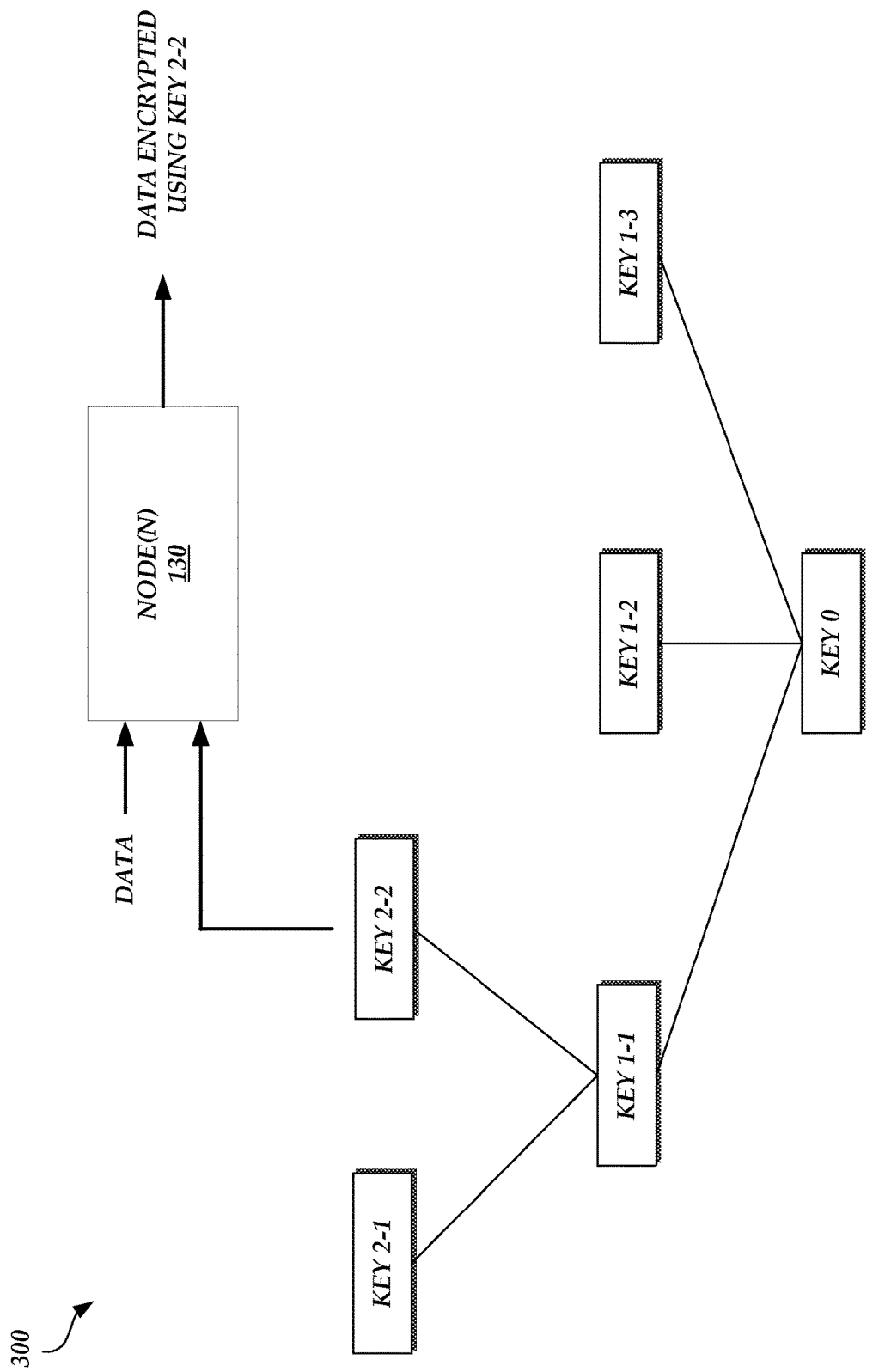
FIGS. 3A-3B illustrate graph structures that depict the keys used to encrypt and re-encrypt data.
Figure 3B:
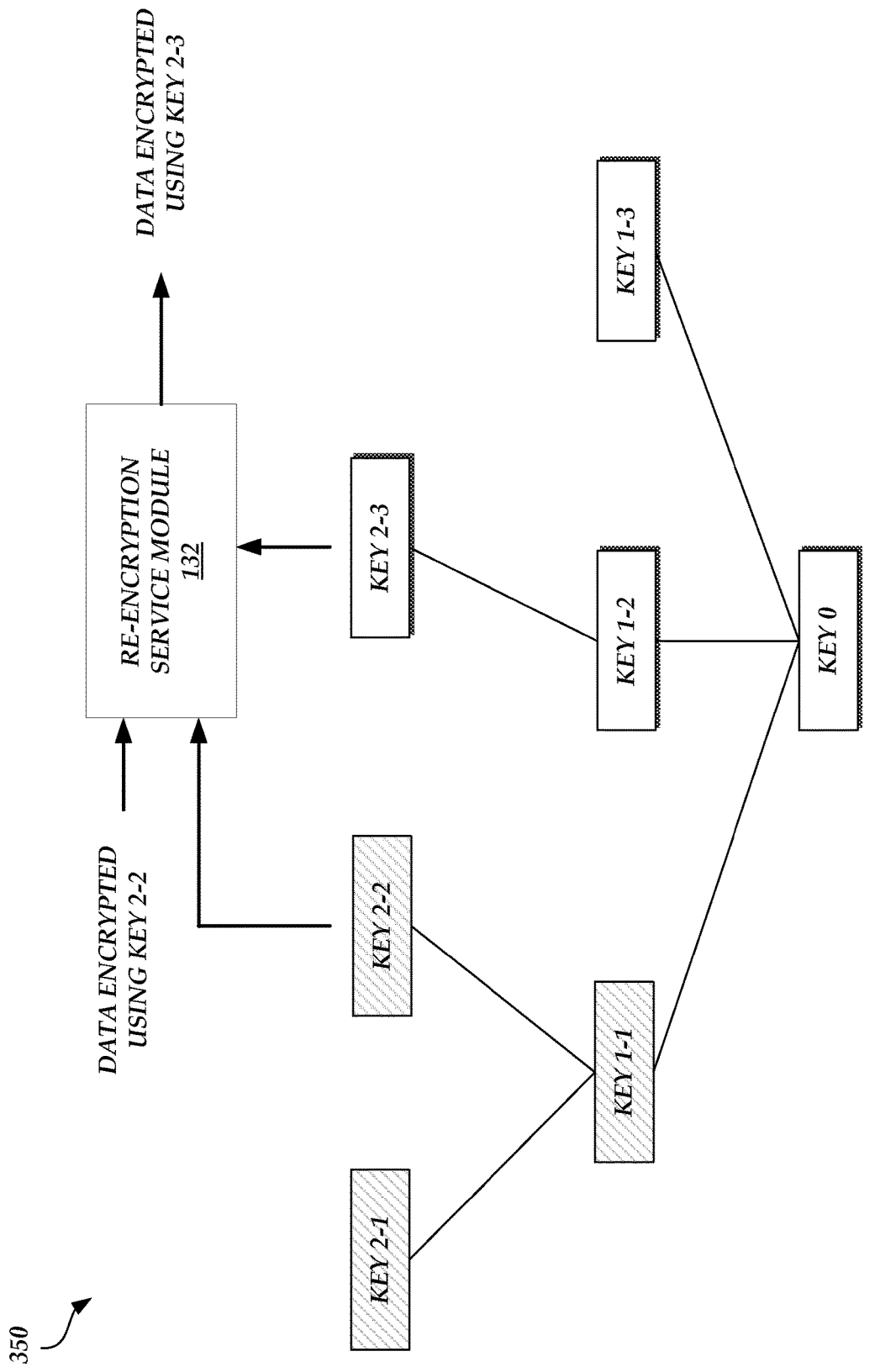

FIGS. 3A-3B illustrate graph structures 300 and 350 that depict the keys used to encrypt and re-encrypt data. As illustrated in FIG. 3A, the graph structure 300 includes 6 encryption keys: key 0, key 1-1, key 1-2, key 1-3, key 2-1, and key 2-2. In an embodiment, key 0 is stored in a key store included in Tier(0), keys 1-1, 1-2, and 1-3 are stored in a key store included in Tier(1), and keys 2-1 and 2-2 are stored in a key store included in Tier(2).

As an example, key 0 is used to encrypt key 1-1, key 1-2, and key 1-3. Key 1-1 is then used to encrypt key 2-1 and key 2-2. Thus, if key 2-1 or key 2-2 is to be used to encrypt data received from a requesting device, such as the requesting device 105, key 1-1 can be used to decrypt key 2-1 or key 2-2 and key 0 can be used to decrypt key 1-1.

In other embodiments, not shown, key 1-2 and/or key 1-3 may not be generated until key 1-1, key 2-1, and/or key 2-2 have been exhausted (e.g., compromised, use limit exceeded, etc.). For example, key 1-2 and key 1-3 may not be created a priori or before they need to be used. Rather, the multi-tiered encryption system can create key 1-2 and/or key 1-3 on-demand when a given policy dictates that additional keys are needed in Tier (1).

For simplicity, key 2-2 is considered to be a literal encryption key that can be used to encrypt data received from the requesting device 105 during an encrypt request. Thus, node(N) 130 receives, from the requesting device 105, a request to encrypt data and uses the key 2-2 to encrypt the data.

After some time has passed, the graph structure 300 may be updated to resemble graph structure 350 depicted in FIG. 3B due to key rotation. As illustrated in FIG. 3B, the graph structure 350 includes 7 encryption keys: key 0, key 1-1, key 1-2, key 1-3, key 2-1, key 2-2, and key 2-3. In an embodiment, key 0 is stored in a key store included in Tier(0), keys 1-1, 1-2, and 1-3 are stored in a key store included in Tier(1), and keys 2-1, 2-2, and 2-3 are stored in a key store included in Tier(2).

As an example, key 0 is used to encrypt key 1-1, key 1-2, and key 1-3. Key 1-1 is then used to encrypt key 2-1 and key 2-2. If key 2-1 and key 2-2 are exhausted (e.g., compromised, use limit exceeded, etc.), Tier(2) may add an additional encryption key. The additional encryption key could be encrypted by key 1-1 if key 1-1 is not exhausted as well. For illustrative purposes, key 1-1, key 2-1, and key 2-2 are all exhausted. Thus, Tier(2) may add an additional encryption key, key 2-3, when an encrypt operation is pending. However, key 2-3 may be encrypted by key 1-2 instead of key 1-1 because key 1-2 is the next available encryption key in Tier(1). Thus, if key 2-3 is to be used to encrypt data received from a requesting device, such as the requesting device 105, key 1-2 can be used to decrypt key 2-3 and key 0 can be used to decrypt key 1-2.

In an embodiment, the node(N) 130 (and specifically the re-encryption service module 132) receives a re-encryption operation request from the requesting device 105 when the graph structure 350 is as illustrated in FIG. 3B. The request may include the data encrypted using key 2-2 and a logical encryption key that identifies the key 2-2. Accordingly, the re-encryption service module 132 may decrypt the encrypted data using the key 2-2 (though the key 2-2 is exhausted, the key 2-2 may still be used for decrypt operations). Given that the key 2-2 is exhausted, the re-encryption service module 132 may use the next available literal encryption key, key 2-3 to encrypt the decrypted data. Thus, the re-encryption service module 132 encrypts the decrypted data using the key 2-3, associates the logical encryption key with the key 2-3 in place of the key 2-2, and transmits the data encrypted using the key 2-3 along with an updated logical encryption key to the requesting device 105.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of re-encrypting data, the method comprising:
   by execution of program instructions by one or more computing devices:
   receiving, from a requesting device separate from the one or more computing devices, a first request to encrypt data;
   encrypting the data using a first key that is not accessed by the requesting device;
   generating a key identifier associated with the first key;
   transmitting, to the requesting device, the encrypted data and the key identifier;
   receiving, from the requesting device, a second request to re-encrypt the encrypted data, wherein the second request comprises the encrypted data and the key identifier;
   determining that the key identifier is associated with the first key and that the first key is exhausted;
   generating a second key at least partly in response to determining that the first key is exhausted;
   decrypting the encrypted data using the first key to generate a decrypted version of the encrypted data;
   encrypting, using the second key, the decrypted version of the encrypted data to generate a re-encrypted version of the encrypted data;
   associating the key identifier with the second key; and
   transmitting, to the requesting device, the re-encrypted version of the data.

2. The computer-implemented method of claim 1, wherein an encrypted version of the first key is stored in a first data store associated with a first node, and wherein the first key is encrypted using a parent key stored in a second data store associated with a second node.

3. The computer-implemented method of claim 2, further comprising:
   determining that the parent key can be used to encrypt data;
   in response to determining that the parent key can be used to encrypt data, encrypting the second key using the parent key to generate an encrypted version of the second key; and
   storing the encrypted version of the second key and a parent key identifier that identifies the parent key in the first data store.

4. The computer-implemented method of claim 2, further comprising:
   determining that the parent key cannot be used to encrypt data;
   in response to determining that the parent key cannot be used to encrypt data, generating a second parent key;
   encrypting the second key using the second parent key to generate an encrypted version of the second key;
   associating the parent key identifier with the second parent key; and
   storing the encrypted version of the second key and the parent key identifier in the first data store.

5. The computer-implemented method of claim 2, wherein the parent key is a master key.

6. The computer-implemented method of claim 1, wherein determining that the first key is exhausted comprises at least one of determining that an amount of data encrypted by the first key has satisfied a first threshold value, determining that a number of times the first key has been used to encrypt data has satisfied a second threshold value, determining that the first key has been in existence for a time period satisfying a third threshold value, or determining that the first key was used to encrypt the data.

7. A system comprising:
   a computer data repository maintained in a non-transitory storage device, the computer data repository configured to at least store keys; and
   a computing system comprising one or more computing devices, the computing system in communication with the computer data repository and configured to at least:
   receive, from a requesting device separate from the computing system, a first request to encrypt data;
   transmit, to the requesting device, an encrypted version of the data and a key identifier associated with a first key that is not accessed by the requesting device, wherein the key identifier is used to encrypt the data;
   receive, from the requesting device, a second request to re-encrypt the encrypted data, wherein the second request specifies the encrypted data and the key identifier;
   determine that the key identifier is associated with the first key and that the first key is exhausted;
   generate a second key at least partly in response to determining that the first key is exhausted;
   decrypt the encrypted data using the first key to generate a decrypted version of the encrypted data;
   encrypt, using the second key, the decrypted version of the encrypted data to generate a re-encrypted version of the encrypted data; and
   associate the key identifier with the second key; and
   transmit, to the requesting device, the re-encrypted version of the data.

8. The system of claim 7, wherein an encrypted version of the first key is stored in a first data store associated with a first node, and wherein the computing system is further programmed to implement an encrypter configured to encrypt the first key using a parent key stored in a second data store associated with a second node.

9. The system of claim 8, wherein the computing system is further configured to at least:
   determine that the parent key can be used to encrypt data;
   in response to determining that the parent key can be used to encrypt data, encrypt the second key using the parent key to generate an encrypted version of the second key;
   store the encrypted version of the second key and a parent key identifier that identifies the parent key in the first data store.

10. The system of claim 8, wherein the computing system is further configured to at least:
    determine that the parent key cannot be used to encrypt data;
    in response to determining that the parent key cannot be used to encrypt data, generate a second parent key;
    encrypt the second key using the second parent key to generate an encrypted version of the second key;
    associate the parent key identifier with the second parent key; and
    store the encrypted version of the second key and the parent key identifier in the first data store.

11. The system of claim 8, wherein the parent key is a master key.

12. The system of claim 7, wherein the encrypted version of data comprises a plurality of data elements, and wherein each data element comprises an encrypted value.

13. The system of claim 12, wherein the computing system is further configured to at least:
for each data element in the plurality of data elements:
decrypt the encrypted value using the first key;
determine that the second key can be used to encrypt data; and
in response to determining that the second key can be used to encrypt data, encrypt the decrypted version of the encrypted value using the second key.

14. The system of claim 12, wherein the computing system is further configured to at least:
for each data element in the plurality of data elements:
decrypt the encrypted value using the first key;
determine that the second key cannot be used to encrypt data;
in response to determining that the second key cannot be used to encrypt data, generate a third key; and
encrypt the decrypted version of the encrypted value using the third key.

15. The system of claim 7, wherein the computing system is further configured to at least determine at least one of:
an amount of data encrypted by the first key has satisfied a first threshold value;
that a number of times that the first key has been used to encrypt data has exceeded a second threshold value;
that the first key has been in existence for a time period satisfying a third threshold value; or
that the first key was used to encrypt the data.

16. A computer storage system comprising a non-transitory storage device, said computer storage system having stored thereon executable program instructions that direct a computer system to at least:
receive, from a requesting device separate from the computer system, a first request to encrypt data;
encrypt the data using a first key that is not accessed by the requesting device;
generate a key identifier associated with the first key;
transmit, to the requesting device, the encrypted data and the key identifier;
receive, from the requesting device, a second request to re-encrypt data, wherein the second request specifies the encrypted data and the key identifier;
determine that the first key is exhausted;
generate a second key at least partly in response to determining that the first key is exhausted;
decrypt the encrypted data using the first key to generate a decrypted version of the encrypted data;
encrypt, using the second key, the decrypted version of the encrypted data to generate a re-encrypted version of the encrypted data;
associate the key identifier with the second key; and
transmit, to the requesting device, the re-encrypted version of the data.

17. The computer storage system of claim 16, wherein the executable program instructions further direct the computer system to at least:
determine that a parent key can be used to encrypt data;
in response to determining that the parent key can be used to encrypt data, encrypt the second key using the parent key to generated an encrypted version of the second key; and
store the encrypted version of the second key and a parent key identifier that identifies the parent key in a first data store.

18. The computer storage system of claim 16, wherein the executable program instructions further direct the computer system to at least:
determine that a parent key cannot be used to encrypt data;
in response to determining that the parent key cannot be used to encrypt data, generate a second parent key;
encrypt the second key using the second parent key to generate an encrypted version of the second key;
associate the parent key identifier with the second parent key; and
store the encrypted version of the second key and the parent key identifier in a first data store.

19. The computer storage system of claim 18, wherein the parent key is a master key.

20. The computer storage system of claim 16, wherein the encrypted data comprises a plurality of data elements, and wherein each data element comprises an encrypted value.

21. The computer storage system of claim 20, wherein the executable program instructions further direct the computer system to at least:
for each data element in the plurality of data elements, decrypt the encrypted value using the first key; and
encrypt the decrypted version of the encrypted value using the second key.

22. The computer storage system of claim 20, wherein the executable program instructions further direct the computer system to at least:
partition the plurality of data elements into a first plurality of data elements and a second plurality of data elements;
provision a first re-encryption service module and a second re-encryption service module;
direct the first re-encryption service module to at least:
decrypt the encrypted value in each data element of the first plurality of data elements using the first key, and
encrypt the decrypted version of the encrypted value in each data element of the first plurality of data elements using the second key; and
direct the second re-encryption service module to at least:
decrypt the encrypted value in each data element of the second plurality of data elements using the first key, and
encrypt the decrypted version of the encrypted value in each data element of the second plurality of data elements using the second key.

23. The computer storage system of claim 16, wherein the executable program instructions further direct the computer system to at least receive, from the requesting device, requests to re-encrypt the encrypted data at periodic intervals.

24. The computer storage system of claim 16, wherein the executable program instructions further direct the computer system to at least determine at least one of:
that an amount of data encrypted by the first key has satisfied a first threshold value;
that a number of times that the first key has been used to encrypt data has satisfied a second threshold value;
that the first key has been in existence for a time period satisfying a third threshold value; or
that the first key was used to encrypt the data.

25. The computer storage system of claim 16, wherein the executable program instructions further direct the computer system to receive, from the requesting device, requests to re-encrypt the encrypted data at periodic intervals.

* * * * *